(12) United States Patent
Singh et al.

(10) Patent No.: US 11,928,975 B2
(45) Date of Patent: Mar. 12, 2024

(54) METHODS AND APPARATUS FOR SERVICING DISTRIBUTED ENERGY GENERATION SYSTEMS USING AN UNMANNED AERIAL VEHICLE

(71) Applicant: Enphase Energy, Inc., Petaluma, CA (US)

(72) Inventors: Vikas Kumar Singh, Karnataka (IN); Saminathan Sangameswaran, Karnataka (IN)

(73) Assignee: Enphase Energy, Inc., Petaluma, CA (US)

( * ) Notice: Subject to any disclaimer, the term of this patent is extended or adjusted under 35 U.S.C. 154(b) by 211 days.

(21) Appl. No.: 17/522,480

(22) Filed: Nov. 9, 2021

(65) Prior Publication Data

US 2022/0157180 A1 May 19, 2022

Related U.S. Application Data

(60) Provisional application No. 63/115,907, filed on Nov. 19, 2020.

(51) Int. Cl.
*G08G 5/00* (2006.01)
*B64C 39/02* (2023.01)
(Continued)

(52) U.S. Cl.
CPC ......... *G08G 5/0069* (2013.01); *B64C 39/024* (2013.01); *G08B 21/18* (2013.01);
(Continued)

(58) Field of Classification Search
CPC .... G08G 5/0069; B64C 39/024; G08B 21/18; H02J 3/381; H02J 2300/24; H02S 50/00; H04W 4/80; B64U 2101/00; H04B 3/54
See application file for complete search history.

(56) References Cited

U.S. PATENT DOCUMENTS 9,991,841 B2 6/2018 Castellucci et al.
10,111,563 B2 10/2018 Grossman et al.
(Continued)

FOREIGN PATENT DOCUMENTS

CN 105608281 A 5/2016
CN 108667419 A 10/2018
(Continued)

OTHER PUBLICATIONS

Martin Libra et al., "Monitoring of Defects of a Photovoltaic Power Plant Using a Drone", Energies, Feb. 27, 2019, vol. 12, Issue 5, pp. 1-9.
(Continued)

*Primary Examiner* — Mohamed Barakat
(74) *Attorney, Agent, or Firm* — Moser Taboada

(57) ABSTRACT

Methods and systems for servicing distributed generators are provided herein. For example, a system for servicing distributed generators comprises a distributed generator comprising a plurality of components, a controller communicatively connected to the plurality of components, and an unmanned aerial vehicle communicatively coupled to at least one of the plurality of components or the controller for at least one of transmitting and receiving data relating to the plurality of components.

18 Claims, 6 Drawing Sheets

(51) Int. Cl.
  *G08B 21/18* (2006.01)
  *H02J 3/38* (2006.01)
  *H02S 50/00* (2014.01)
  *B64U 101/00* (2023.01)
  *H04B 3/54* (2006.01)
  *H04W 4/80* (2018.01)

(52) U.S. Cl.
  CPC .............. *H02J 3/381* (2013.01); *H02S 50/00* (2013.01); *B64U 2101/00* (2023.01); *H02J 2300/24* (2020.01); *H04B 3/54* (2013.01); *H04W 4/80* (2018.02)

(56) References Cited

U.S. PATENT DOCUMENTS

| | | | |
|---|---|---|---|
| 10,207,801 | B2 | 2/2019 | Garcia-Gabin et al. |
| 2016/0004795 | A1 | 1/2016 | Novak |
| 2016/0147209 | A1 | 5/2016 | Stoupis et al. |
| 2016/0364989 | A1* | 12/2016 | Speasl .................. G08G 5/0082 |
| 2017/0173640 | A1 | 6/2017 | Grossman et al. |
| 2017/0295069 | A1* | 10/2017 | Sweet, III .......... H04B 7/18504 |
| 2018/0003656 | A1 | 1/2018 | Michini et al. |
| 2018/0020081 | A1* | 1/2018 | Teague .................. B64C 39/024 |
| 2019/0013775 | A1 | 1/2019 | Grossman et al. |
| 2019/0031344 | A1 | 1/2019 | Hitchcock |
| 2019/0042227 | A1* | 2/2019 | Sharma ..................... G06F 8/65 |
| 2019/0184544 | A1 | 6/2019 | Tadayon |
| 2020/0041560 | A1 | 2/2020 | Schwartz et al. |
| 2020/0160728 | A1* | 5/2020 | Speasl .................... B64U 80/70 |
| 2020/0184706 | A1* | 6/2020 | Speasl .................... H04L 9/0643 |
| 2020/0279963 | A1* | 9/2020 | Yoscovich .......... H01L 31/0504 |
| 2020/0286389 | A1* | 9/2020 | Speasl .................... B64U 80/70 |
| 2020/0349853 | A1* | 11/2020 | Speasl .................. G08G 5/0082 |
| 2020/0410872 | A1* | 12/2020 | Speasl .................. G08G 5/0082 |
| 2021/0309361 | A1* | 10/2021 | Foran ..................... G08C 17/02 |
| 2022/0007213 | A1* | 1/2022 | Mokrushin ........... H04W 24/08 |

FOREIGN PATENT DOCUMENTS

| | | | |
|---|---|---|---|
| CN | 109194284 | A | 1/2019 |
| CN | 110277962 | A | 9/2019 |
| CN | 110171565 | B | 3/2020 |
| CN | 111028378 | A | 4/2020 |
| DE | 102018122319 | A1 | 3/2020 |
| EP | 2104073 | A2 | 9/2009 |
| KR | 101409781 | B1 | 6/2014 |
| KR | 20180138354 | A | 12/2018 |
| WO | WO-2019115843 | A1 | 6/2019 |
| WO | WO-2019144317 | A1 | 8/2019 |

OTHER PUBLICATIONS

International Search report and Written Opinion for application No. PCT/US2021/058573, dated Mar. 3, 2022.
"Advanced Wireless Data Links and Communications for Drones, UAVs, UGVs, USVs", https://www.unmannedsystemstechnology.com/company/commtact-ltd/.
"Autonomous inspections and monitoring for solar energy", https://percepto.co/solar-energy-industry/.
"Drone Mapping for Solar Panel Inspection and Installation", www.dronedeploy.com/solutions/renewable-energy.
Hebrio et al., "Sensor Network and UAV Data Collector", https://www.ece.ucdavis.edu/wp-content/uploads/2016/05/Quadcopter-Final-Report.pdf.
"NETRA Pro UAV", www. https://www.ideaforge.co.in/drones/netra-pro-uav/.
Julia Pyper, "SunPower Reinvents Large-Scale Solar Plants With Drones, Robots and Tomatoes", dated Sep. 28, 2016, www. https://www.greentechmedia.com/articles/read/sunpower-reinvents-large-scale-solar-plants-with-drones-robots-and-tomatoe.
Jack Loughran, "Drones used to collect data from remote IoT devices", dated Dec. 13, 2019, https://eandt.theiet.org/content/articles/2019/12/drones-used-to-collect-data-from-remote-iot-devices/.
Idbella et al., "AgriLogger: A New Wireless Sensor for Monitoring Agrometeorological Data in Areas Lacking Communication Networks", published on Mar. 12, 2020, https://res.mdpi.com/d_attachment/sensors/sensors-20-01589/article_deploy/sensors-20-01589.pdf.

* cited by examiner

METHODS AND APPARATUS FOR SERVICING DISTRIBUTED ENERGY GENERATION SYSTEMS USING AN UNMANNED AERIAL VEHICLE

CROSS-REFERENCE TO RELATED APPLICATIONS

The present application claims the benefit of and priority to U.S. Provisional Application Ser. No. 63/115,907, which was filed on Nov. 19, 2020, the entire contents of which is incorporated herein by reference.

BACKGROUND

Field

Embodiments of the present disclosure generally relate to distributed energy generation systems and, in particular, to methods and apparatus for servicing distributed energy generation systems using an unmanned aerial vehicle.

Description of the Related Art

A distributed energy generation system, which may also be referred to as a distributed generator (DG), typically comprises a plurality of energy generators (e.g., solar panels, wind turbines, etc.), one or more power converters (e.g., optimizers, microinverters, inverters, etc.), and a service panel to connect the system to loads and/or a utility power grid. For a solar system, such as a solar farm, the solar panels are arranged in an array and positioned to maximize solar exposure. Each solar panel or small groups of panels may be coupled to a power converter (referred to as a microinverter) or all the solar panels may be coupled to a single inverter via DC-DC optimizers. The inverter(s) convert the DC power produced by the solar panels into AC power which is coupled to the service panel for use by a facility (e.g., home or business), supplied to the power grid, and/or coupled to an optional storage element such that energy produced at one time is stored for use at a later time.

Generally, the DG is connected to a communication network, for example by a local controller, and data generated by components of the DG (such as alarms and status message) is communicated via the network to a remote controller for uses such as real-time monitoring and data analysis. Additionally, data (such as control commands) may be transmitted via the network to one or more DG components. However, for DGs deployed in remote or difficult to access locations, such connectivity to a communication network may not be possible or network service may not even be available.

Therefore, there is a need for a method and apparatus for servicing DGs that do not have sufficient communication network connectivity.

SUMMARY

Embodiments disclosed herein provide methods and apparatus for servicing distributed energy generation systems using an unmanned aerial vehicle. For example, a system for servicing distributed generators comprises a distributed generator comprising a plurality of components, a controller communicatively connected to the plurality of components, and an unmanned aerial vehicle communicatively coupled to at least one of the plurality of components or the controller for at least one of transmitting and receiving data relating to the plurality of components.

In accordance with at least some embodiments, a method for servicing distributed generators comprises positioning an unmanned aerial vehicle into communicative range with at least one of a distributed generator comprising a plurality of components or a controller communicatively connected to the plurality of components and at least one of transmitting and receiving data relating to the plurality of components.

In accordance with at least some embodiments, a non-transitory computer readable storage medium has instructions stored thereon that when executed by a processor perform a method for servicing distributed generators comprises positioning an unmanned aerial vehicle into communicative range with at least one of a distributed generator comprising a plurality of components or a controller communicatively connected to the plurality of components and at least one of transmitting and receiving data relating to the plurality of components.

BRIEF DESCRIPTION OF THE DRAWINGS

So that the manner in which the above recited features of the present disclosure can be understood in detail, a particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure comprise apparatus and methods for servicing distributed generators (DGs) not having sufficient communication network access, such as no communication network connectivity, low communication network bandwidth, and/or no local system controller. Such servicing may include retrieving data from the DG, sending commands to one or more components of the DG, installing software patches and/or new software, and the like.

In one or more embodiments, the communication technique described herein comprises an unmanned aerial vehicle (UAV), which also may be referred to as a drone, communicating with one or more components of a DG comprising one or more solar panels (which also may be referred to as photovoltaic, or PV, modules). The drone may fly over the DG and communicate with DG components, such as power conditioners or a local controller, to send and/or collect data. In various embodiments, the drone may use location data, such as GPS, for locating the DG components with which it will communicate. Such communication may be over WiFi or Bluetooth, although any suitable wireless connection may be used. In addition to communicating with the DG, the drone may monitor one or more components of the DG for detecting an anomaly. For example, where the DG comprises one or more solar panels, the drone may communicate with the one or more solar panels for monitoring panel temperature, positioning (e.g., alignment) of the panels, etc.

In certain embodiments, the drone may utilize cellular network technology to live-push data to a remote controller or system. In other embodiments, the drone may store the collected data until it moves to another location where the data is then transmitted. For example, while flying, the drone may reach an area where communication network connectivity becomes available, or the drone may fly to a base location (remote location) where the data is offloaded.

Figure 1:
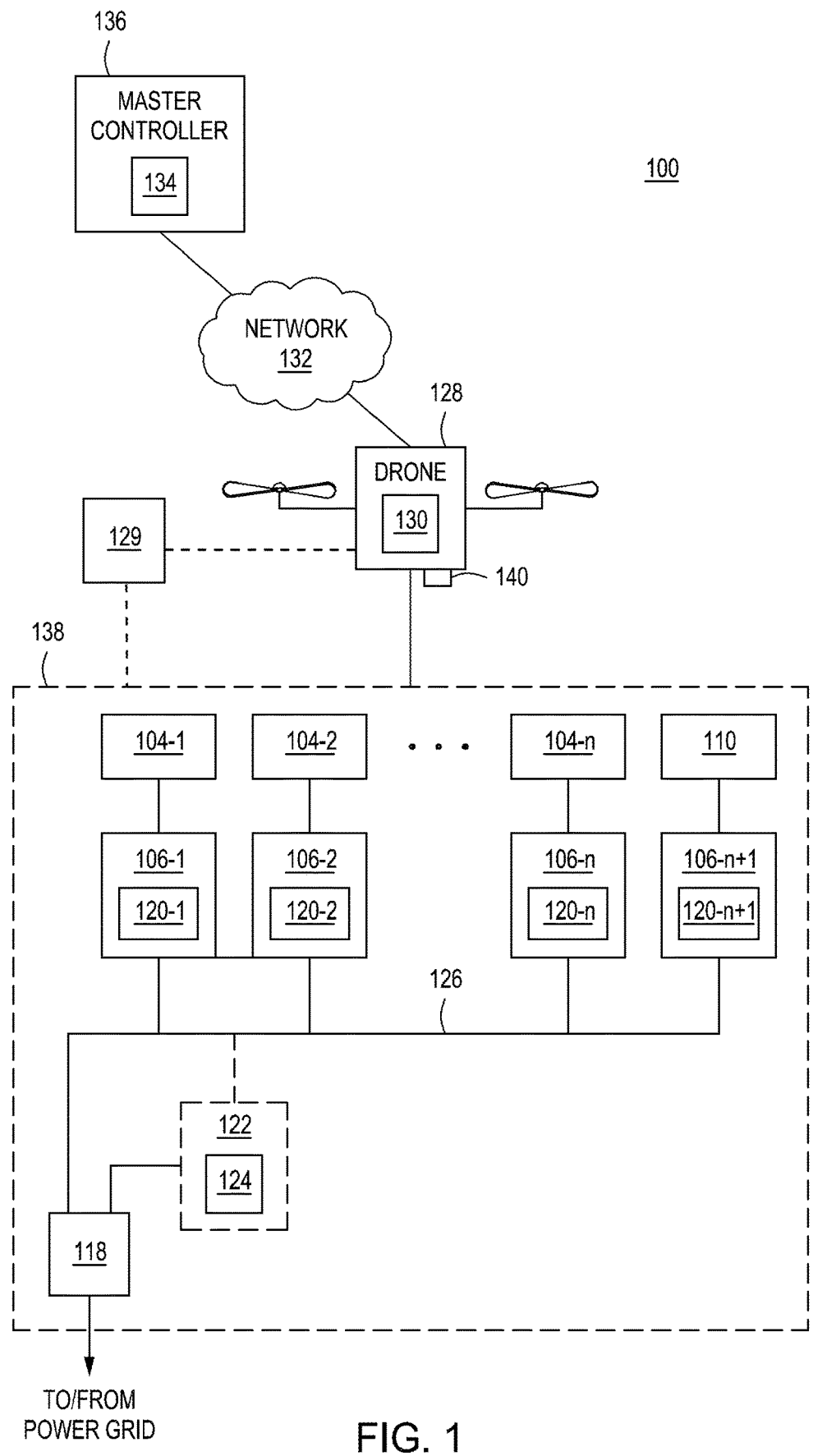
FIG. 1 depicts a block diagram of system in accordance with at least one embodiment of the disclosure.

FIG. 1 depicts a block diagram of system 100 in accordance with at least one embodiment of the disclosure. The system 100 comprises a distributed generator (DG 138) comprising a plurality of solar panels $104_1, 104_2, \ldots 104_n$, collectively referred to as solar panels 104, coupled in a one-to-one correspondence to a plurality of power converters $106_1, 106_2, \ldots 106_n$, collectively referred to as power converters 106. The DG 138 further comprises an energy storage device 110 (e.g., a battery) coupled to a power converter $106_{n+1}$, which is a bi-directional power converter. The power converters $106_1$-$106_{n+1}$, collectively referred to as power converters 106, convert the DC power received from the corresponding solar panels $104_1$-$104_n$ and the energy storage device 110 to grid-compliant AC power and couple the generated AC power to a bus 126, which is further coupled to a service panel 118. The service panel 118 couples the generated power to one or more appliances and/or a power grid, such as a local power grid or a commercial power grid. In other embodiments, the power converters 106 may be coupled to the appliance(s), grid, and/or a local controller without the use of the service panel 118.

In various embodiments, a local controller 122 (optional) is coupled to the bus 126 and comprises a controller 124 described further below. The local controller 122, which may be referred to as a gateway, communicates with the power converters 106 utilizing a wired connection, e.g., power line communication (PLC), although additional or alternative types of wired and/or wireless communication may be used. The local controller 122 may retrieve data from the power converters 106, send commands to the power converters 106, and perform similar functions with respect to the power converters 106.

The DG 138 is generally located in an area where connectivity to a communication network, such as the Internet, is limited or non-existent, for example in a remote and/or difficult to access location (e.g., on a mountain or skyscraper, in a rural village, and the like). In other embodiments, the techniques described herein may be used for DGs that normally have network connectivity but have experienced a degradation or loss of such connectivity, for example following a natural disaster.

Although FIG. 1 depicts the DG 138 as having multiple PV modules 104 coupled one-to-one with corresponding power converters 106, in other embodiments the DG 138 may have a different configuration as this depiction is not meant to limit the scope of the disclosure. For example, one or more power converters 106 may be coupled to multiple PV modules 104, only a single PV module 104 coupled to a single power converter 106 may be present, or only a single power converter 106 may be present and coupled to multiple solar panels. In other examples, the power converters 106 may be DC-DC converters, also referred to as optimizers or conditioners, and may be coupled to a single DC-AC inverter. Furthermore, the DG 138 may additionally or alternatively have other forms of energy generation such as wind turbines arranged on a so-called "wind farm", additional energy storage in a battery-based storage system or other forms of energy storage (such as fly wheel(s), hot fluid tank(s), hydrogen storage system(s), pressurized gas storage system(s), pumped storage hydropower, fuel cells, or the like).

In accordance with one or more embodiments of the present disclosure, an unmanned aerial vehicle (UAV), e.g., a drone 128, communicates with the power converters 106 for servicing, such as retrieving data (e.g., alarms, alerts, status messages, and the like), sending commands (e.g., to control power production, to control data retrieval, to set provisionable parameters of the power converters, and the like), and installing software (e.g., software patches, new software, and the like). In those embodiments in which the local controller 122 is present, the drone 128 may additionally or alternatively communicate with the local controller 122 for servicing.

The drone 128 uses location data, such as GPS, to locate the power converters 106 (and/or the local controller 122 in certain embodiments). Location coordinates for the DG 138 components may be pre-programmed in the drone 128 or wirelessly communicated to the drone 128 while in flight. The drone 128 may communicate with the power converters 106/local controller 122 over Wi-Fi or Bluetooth, although any suitable wireless technique may be used. Generally, an authentication technique is utilized when establishing communication between the drone 128 and the power converters 106/local controller 122 to ensure authorized access of the DG components and that the drone 128 is communicating with the desired component.

The drone 128 may wirelessly transmit data collected from the DG 138 to a master controller 136, which may be cloud-based, via a communications network 132, for example using cellular network technology such as 4G technology, 5G technology, or the like. The drone 128 may transmit the data while flying over the DG 138 (e.g., in real time as the drone 128 receives the data from the DG 138), or after the drone 128 has left the DG area (for example, once the drone 128 reaches a region where it can connect to the communications network 132). The master controller 136, which has a controller 134, may use the received data in real-time, for example for monitoring the DG 138, and/or store some or all of the data for later use, for example for long-term data analysis.

In other embodiments, the drone 128 may offload the collected data, for example to the master controller 136 or another system, upon returning to a base station (e.g., a remote base controller).

In addition to communicating with the DG 138, the drone 128 may monitor one or more components of the DG 138 for detecting issues and/or anomalies, such as panel misalignment, solar panel temperature issues that result in decreased efficiency, and the like. In various embodiments, the drone 128 may have a thermal sensor 140 that determines the temperature at one or more points for each of the PV modules 104. The drone 128 may utilize the temperature data to determine the health of the PV modules 104, such as by identifying any solar panel "hot spots" or other temperature-related issues among the PV modules 104. The drone 128 may itself perform such assessment of the solar panel health and transmit the results to the master controller 136 or another device. Additionally or alternatively, the drone 128 may transmit the sensed temperature values to the master controller 136 (or another device) for analysis.

Figure 2:
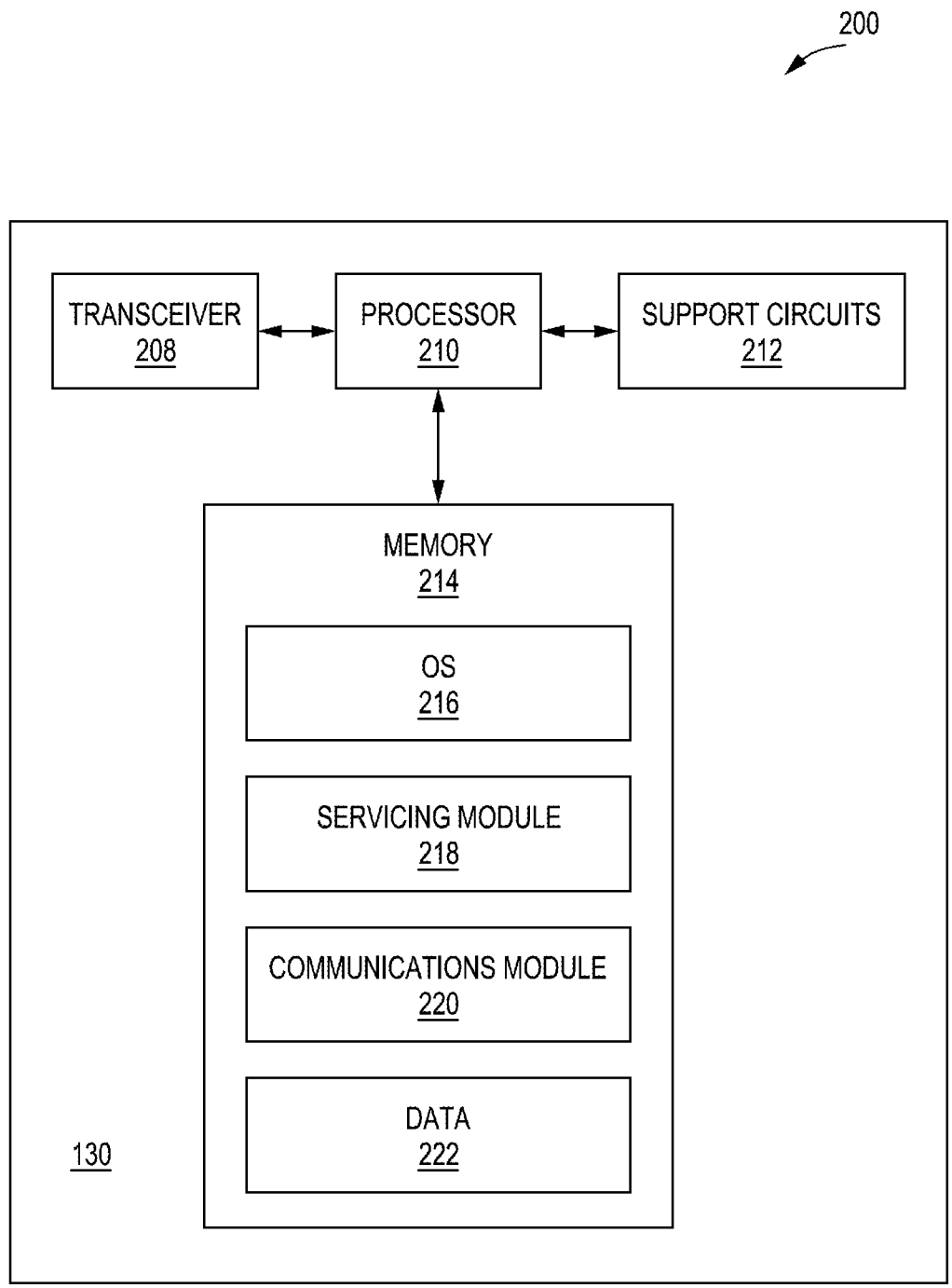
FIG. 2 depicts a block diagram of a drone controller in accordance with an embodiment of the disclosure.

FIG. 2 depicts a block diagram 200 of a drone controller 130 in accordance with an embodiment of the disclosure. The drone controller 130 comprises a transceiver 208, support circuits 212 and memory 214, each coupled to the processor 210. The processor 210 may be any form of processor or combination of processors including, but not limited to, central processing units, microprocessors, microcontrollers, field programmable gate arrays, graphics processing units, and the like. The transceiver 208 can bidirectionally communicate with the DG components, the master controller 136, as well as other devices (e.g., GPS satellites). The support circuits 212 may comprise well-known circuits and devices facilitating functionality of the processor(s). The support circuits 212 may comprise one or more of, or a combination of, power supplies, clock circuits, communications circuits, cache, and/or the like.

The memory 214 comprises one or more forms of non-transitory computer readable storage medium including one or more of, or any combination of, read-only memory or random-access memory. The memory 214 stores software (e.g., instructions) and data including, for example, an operating system 216, a servicing module 218, a communications module 220, and data 222. The operating system 216 may be any form of operating system such as, for example, Apple iOS, Microsoft Windows, Apple macOS, Linux, Android or the like. The servicing module 218 may be software that, when executed by the processor 210, is capable of servicing DGs in accordance with embodiments of the disclosure described herein. The communication module 220 may be software that, when executed by the processor 210, enables communication between the drone 128 and one or more devices in accordance with embodiments of the disclosure described herein. The communication module 220 may include information such as location data for DG components to be serviced, data to be communicated to DG components, data retrieved from DG components, and the like.

Figure 3:
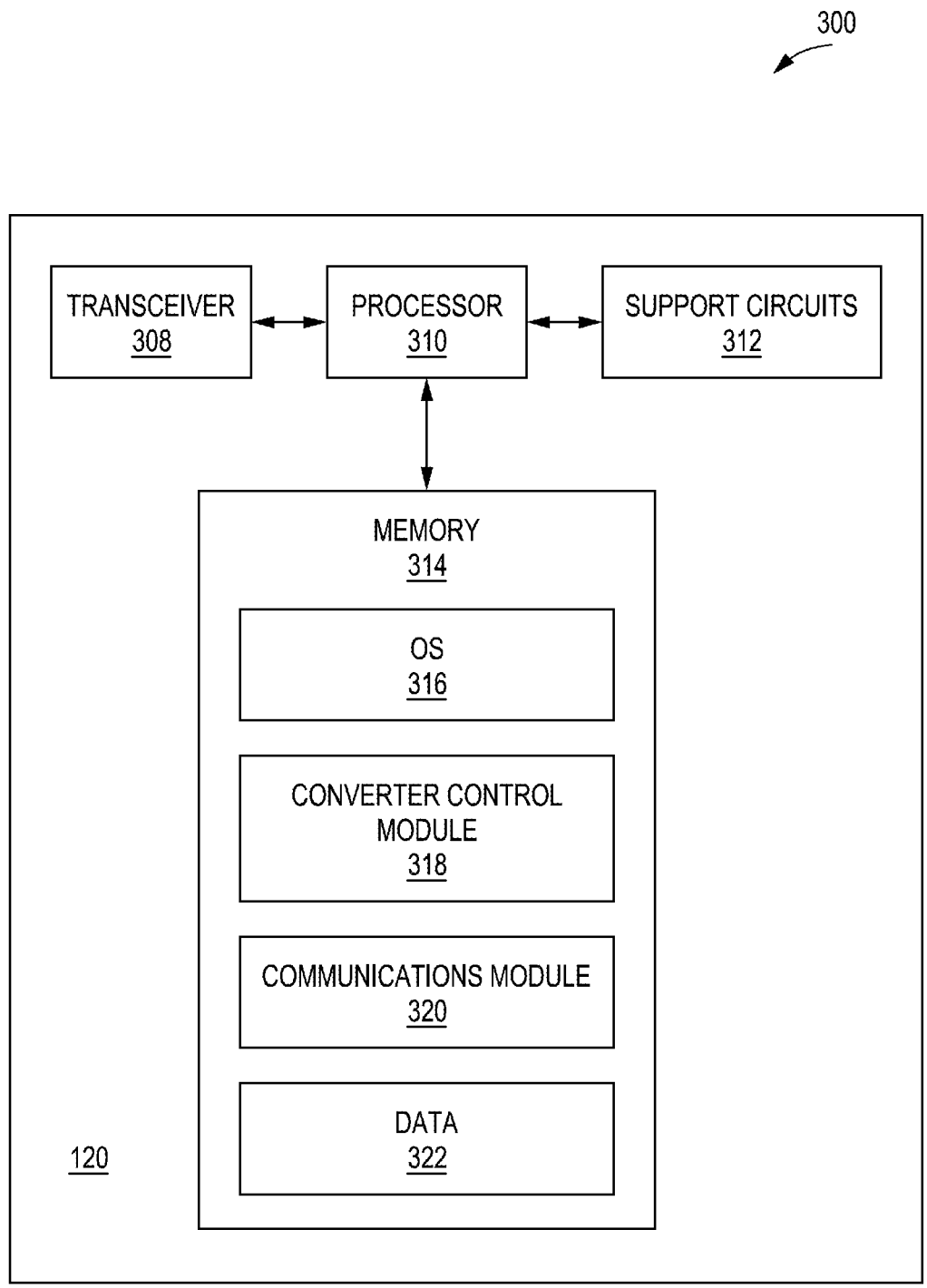
FIG. 3 depicts a block diagram of a power converter controller in accordance with an embodiment of the disclosure.

FIG. 3 depicts a block diagram 300 of a power converter controller 120 in accordance with an embodiment of the disclosure. The power converter controller 120 comprises a transceiver 308, support circuits 312 and memory 314, each coupled to the processor 310. The processor 310 may be any form of processor or combination of processors including, but not limited to, central processing units, microprocessors, microcontrollers, field programmable gate arrays, graphics processing units, and the like. The transceiver 308 enables wireless communication with the drone 128. For example, in embodiments in which the local controller 122 is present, the power converter controller 120 may include another transceiver for PLC communication with the local controller 122. The support circuits 312 may comprise well-known circuits and devices facilitating functionality of the processor(s). The support circuits 312 may comprise one or more of, or a combination of, power supplies, clock circuits, communications circuits, cache, and/or the like.

The memory 314 comprises one or more forms of non-transitory computer readable media including one or more of, or any combination of, read-only memory or random-access memory. The memory 314 stores software and data including, for example, an operating system 316, a converter control module 318, a communications module 320, and data 322. The operating system 316 may be any form of operating system such as, for example, Apple iOS, Microsoft Windows, Apple macOS, Linux, Android or the like. The converter control module 318 may be software that, when executed by the processor 310, controls operation of the power converter 106, such as power conversion, data collection, and the like, in accordance with embodiments of the disclosure described herein. The communication module 320 may be software that, when executed by the processor 310, enables communication between the power converter 106 and the drone 128 in accordance with embodiments of the disclosure described herein; in those embodiments in which the local controller 122 is present, the memory 314 may include another communication module that enables PLC communication with the local controller 122. The communication module 320 may include information such as health and performance data, and the like.

Figure 4:
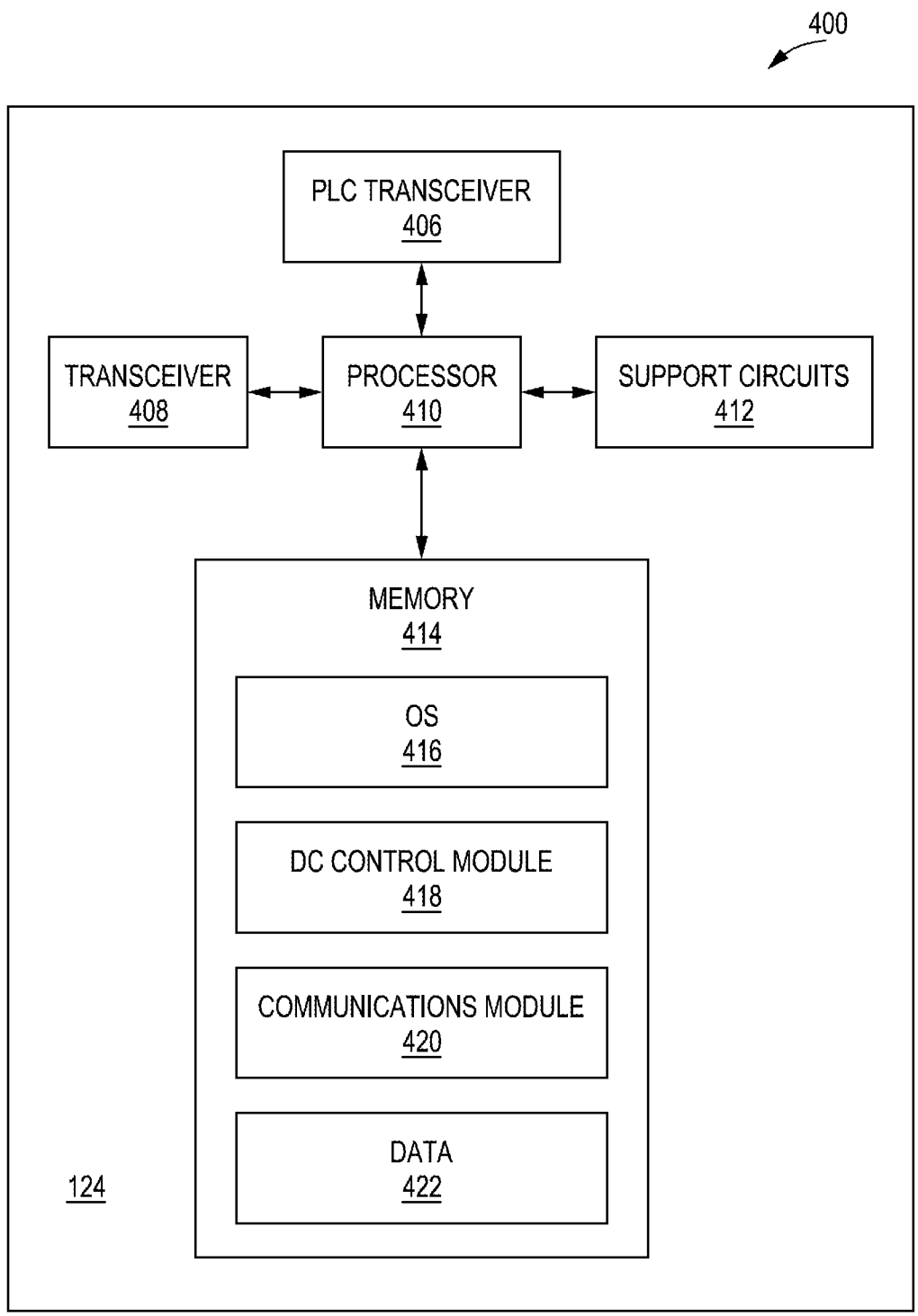
FIG. 4 depicts a block diagram of a controller for a local controller in accordance with an embodiment of the disclosure.

FIG. 4 depicts a block diagram 400 of a controller 124 for a local controller 122 in accordance with an embodiment of the disclosure. The controller 124 comprises a PLC transceiver 406, a transceiver 408, support circuits 412 and memory 414, each coupled to the processor 410. The processor 410 may be any form of processor or combination of processors including, but not limited to, central processing units, microprocessors, microcontrollers, field programmable gate arrays, graphics processing units, and the like. The PLC transceiver 406 enables PLC communication with the power converters 106; the transceiver 408 enables wireless communication with the drone 128. The support circuits 412 may comprise well-known circuits and devices facilitating functionality of the processor 410. The support circuits 412 may comprise one or more of, or a combination of, power supplies, clock circuits, communications circuits, cache, and/or the like.

The memory 414 comprises one or more forms of non-transitory computer readable media including one or more of, or any combination of, read-only memory or random-access memory. The memory 414 stores software and data including, for example, an operating system 416, a DG control module 418, a communications module 420, and data 422. The operating system 416 may be any form of operating system such as, for example, Apple iOS, Microsoft Windows, Apple macOS, Linux, Android or the like. The DG control module 418 may be software that, when executed by the processor 410, may control the power converters 106 (e.g., by transmitting commands to the power converters 106), receive data from the power converters 106 (e.g., performance data), transmit data to the power converters 106 (e.g., software), and the like controls operation of the power converter 106, such as power conversion, data collection, and the like, in accordance with embodiments of the disclosure described herein. The communication module 420 may be software that, when executed by the processor 410, enables communication between the local controller 122 and the drone 128 in accordance with embodiments of the disclosure described herein; additionally, the memory 414 may include another communication module that enables PLC communication with the power converters 106. The communication module 420 may include information such as health and performance data collected from the power converter 106, and the like.

Figure 5:
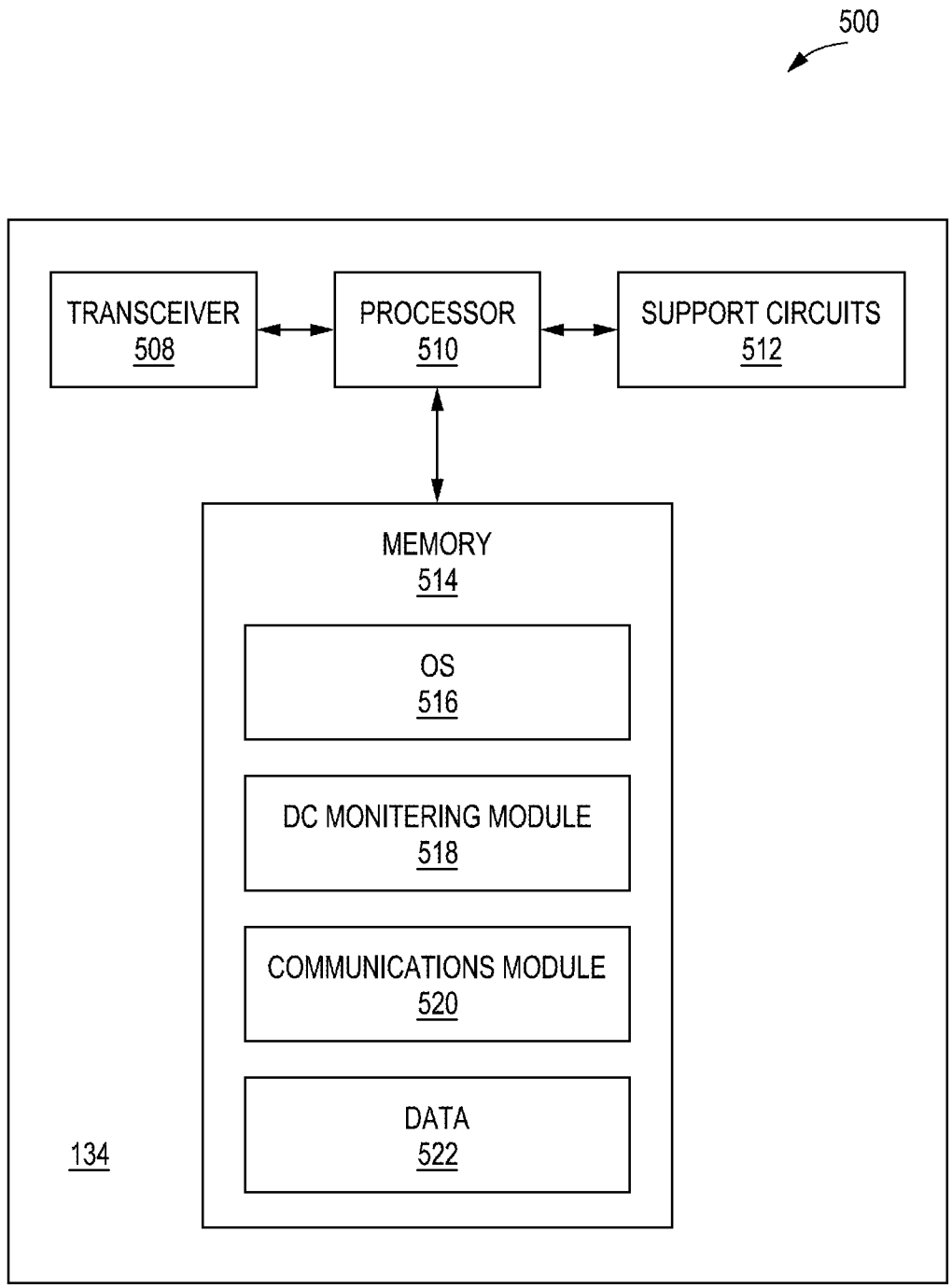
FIG. 5 depicts a block diagram of a controller for a master controller in accordance with an embodiment of the disclosure.

FIG. 5 depicts a block diagram 500 of a controller 134 for a master controller 136 in accordance with an embodiment of the disclosure. The controller 134 comprises a transceiver 508, support circuits 512 and memory 514, each coupled to the processor 510. The processor 510 may be any form of processor or combination of processors including, but not limited to, central processing units, microprocessors, microcontrollers, field programmable gate arrays, graphics processing units, and the like. The transceiver 508 enables wireless communication with the drone 128. The support circuits 512 may comprise well-known circuits and devices facilitating functionality of the processor 510. The support circuits 512 may comprise one or more of, or a combination of, power supplies, clock circuits, communications circuits, cache, and/or the like.

The memory 514 comprises one or more forms of non-transitory computer readable media including one or more of, or any combination of, read-only memory or random-access memory. The memory 514 stores software and data including, for example, an operating system 516, a DG monitoring module 518, a communications module 520, and data 522. The operating system 516 may be any form of operating system such as, for example, Apple iOS, Microsoft Windows, Apple macOS, Linux, Android or the like. The DG monitoring module 518 may be software that, when executed by the processor 510, enables monitoring of the DG 138, such as real-time monitoring of data collected by the drone 128, in accordance with embodiments of the disclosure described herein. The communication module 520 may be software that, when executed by the processor 510, enables communication between the master controller 136 and the drone 128 in accordance with embodiments of the disclosure described herein. The communication module 520 may include information such as data pertaining to the DG 138 (e.g., location information, target performance data, and the like) and/or data collected from the DG 138 by the drone 128.

Figure 6:
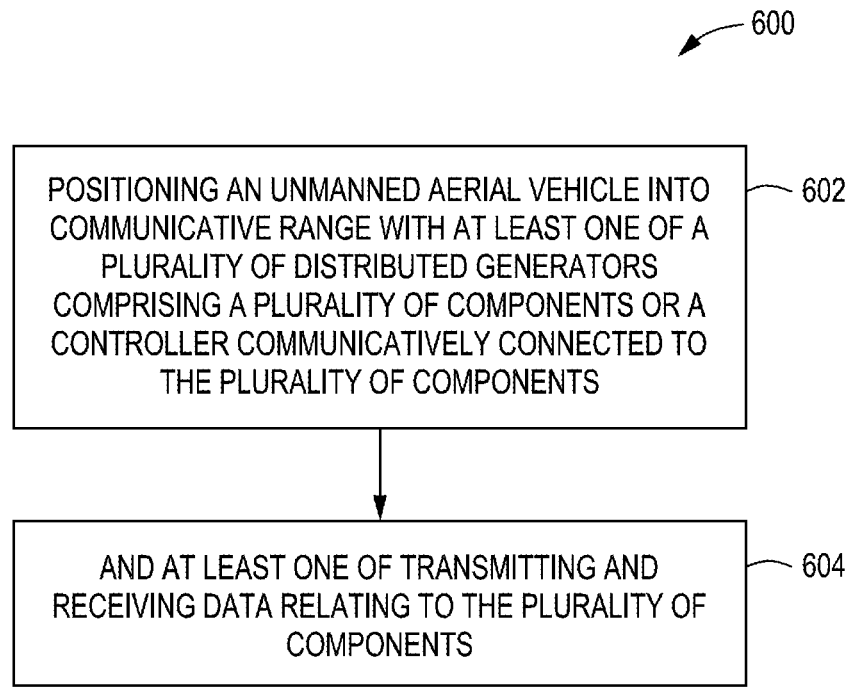
FIG. 6 is a flowchart of a method for servicing distributed generators using the system of FIG. 1 in accordance with an embodiment of the disclosure.

FIG. 6 is a flowchart of a method 600 for servicing distributed generators (e.g., the DG 138) using the system 100 of FIG. 1. For example, at 602, the method 600 comprises positioning an unmanned aerial vehicle into communicative range with at least one of a distributed generator comprising a plurality of components or a controller communicatively connected to the plurality of components (e.g., at least one of a plurality of photovoltaic modules or a plurality of power conditioners). For example, at 602, the drone 128 can be positioned in communicative range of the DG 138 including the PV modules 104 and/or the local controller 122. In at least some embodiments, the method 600 comprising positioning the unmanned aerial vehicle into communicative range with a remote base controller for the at least one of transmitting and receiving data relating to the plurality of components. For example, a remote base controller 129, which is different from the local controller 122, can be communicatively connected to at least one of the plurality of components (e.g., at least one of a plurality of photovoltaic modules or a plurality of power conditioners) or the local controller 122, such as when access (positioning) to the local controller 122 is not practical or unachievable. In at least some embodiments, the drone 128 has stored thereon location data of at least one of the plurality of components or the controller. For example, the drone 128 can have GPS data to facilitate positioning the drone 128 in communicative range with the local controller 122, the PV modules 104, and/or the remote base controller 129.

Next, at 604, the method 600 comprises at least one of transmitting and receiving data relating to the plurality of components. For example, in at least some embodiments, transmitting data comprises the drone 128 transmitting commands to the local controller 122 for at least one of controlling the plurality of components, installing software patches on the plurality of components, or installing new software on the plurality of components. Similarly, when the plurality of components is a plurality of photovoltaic modules, at 604, receiving data comprises receiving photovoltaic module alignment information of the plurality of photovoltaic modules, a temperature of the plurality of photovoltaic modules, alarms, alerts, or status messages. For example, in at least some embodiments, the drone 128 can receive from the local controller 122 photovoltaic module alignment information of the plurality of PV modules 104 or a temperature of the plurality of PV modules 104 and/or alarms, alerts, status messages of the power converters 106 of the PV modules 104.

Alternatively or additionally, at 604, the drone 128 can transmit/receive information directly to/from the power converters 106 and/or the remote base controller 129.

The techniques described herein for servicing DGs enable the deployment of DGs to be expanded beyond easily accessible locations. Further, the techniques described herein allow for denser installation of DG components since spacing between components that would otherwise be required for manual access can be reduced or eliminated. For example, a DG having 20 solar panels spaced apart to allow manual access can have 30 solar panels deployed within the same footprint when using the techniques described herein. Furthermore, the techniques described herein enable notification to a user/service provider of changes related to damage and other types of system changes. For example, if one or more solar panels are moved from their place, the drone will collect the data and notify the user/service provider. Furthermore, the techniques described herein enable the discovery/identification of structures occurring after the solar panel installation which may impact the solar panel operation/power production, such as a tree or building that occurs after solar panel installation. For example, the drone may check for nearby structure to identify new shade sources which can reduce solar panel power production.

While the foregoing is directed to embodiments of the present disclosure, other and further embodiments of the disclosure may be devised without departing from the basic scope thereof.

What is claimed is:

1. A system for servicing distributed generators, comprising: a distributed generator comprising a plurality of components;
   a controller communicatively connected to the plurality of components; and
   an unmanned aerial vehicle communicatively coupled to at least one of the plurality of components or the controller for at least one of transmitting and receiving data relating to the plurality of components,
   wherein, when transmitting or receiving data to or from the at least one of the plurality of components or the controller, the data is used for installing software patches on the plurality of components or installing new software on the plurality of components, and
   wherein, when the plurality of components is a plurality of photovoltaic modules, receiving data comprises receiving information comprising photovoltaic module alignment information of the plurality of photovoltaic modules from at least one of the controller or directly from the plurality of photovoltaic modules via one of Wi-Fi, Bluetooth, or cellular network technology.

2. The system of claim 1, wherein the unmanned aerial vehicle is a drone.

3. The system of claim 1, wherein the plurality of components comprise at least one of a plurality of photovoltaic modules or a plurality of power conditioners.

4. The system of claim 1, wherein transmitting data further comprises transmitting commands to the controller for controlling the plurality of components.

5. The system of claim 1, wherein the unmanned aerial vehicle has stored thereon location data of at least one of the plurality of components or the controller.

6. The system of claim 1, wherein the controller is communicatively connected to the plurality of components via a power line communication and the unmanned aerial vehicle via a wireless connection comprising the Wi-Fi or the Bluetooth, and wherein the unmanned aerial vehicle is at least one of 4G or 5G enabled.

7. The system of claim 1, further comprising a remote base controller different from the controller and communicatively connected to at least one of the plurality of components or the controller and the unmanned aerial vehicle.

8. A method for servicing distributed generators, comprising:
    positioning an unmanned aerial vehicle into communicative range with at least one of a distributed generator comprising a plurality of components or a controller communicatively connected to the plurality of components; and
    at least one of transmitting and receiving data relating to the plurality of components,
    wherein, when transmitting or receiving data to or from the at least one of the plurality of components or the controller, the data is used for installing software patches on the plurality of components or installing new software on the plurality of components, and
    wherein, when the plurality of components is a plurality of photovoltaic modules, receiving data comprises receiving information comprising photovoltaic module alignment information of the plurality of photovoltaic modules from at least one of the controller or directly from the plurality of photovoltaic modules via one of Wi-Fi, Bluetooth, or cellular network technology.

9. The method of claim 8, wherein the unmanned aerial vehicle is a drone.

10. The method of claim 8, wherein the plurality of components comprise at least one of a plurality of photovoltaic modules or a plurality of power conditioners.

11. The method of claim 8, wherein transmitting data further comprises transmitting commands to the controller for controlling the plurality of components.

12. The method of claim 8, wherein the unmanned aerial vehicle has stored thereon location data of at least one of the plurality of components or the controller.

13. The method of claim 8, wherein the controller is communicatively connected to the plurality of components via a power line communication and the unmanned aerial vehicle via a wireless connection comprising the Wi-Fi or the Bluetooth, and wherein the unmanned aerial vehicle is at least one of 4G or 5G enabled.

14. The method of claim 8, further comprising positioning the unmanned aerial vehicle into communicative range with a remote base controller, which is different from the controller and communicatively connected to at least one of the plurality of components or the controller, for the at least one of transmitting and receiving data relating to the plurality of components.

15. A non-transitory computer readable storage medium having instructions stored thereon that when executed by a processor perform a method for servicing distributed generators, comprising:
    positioning an unmanned aerial vehicle into communicative range with at least one of a distributed generator comprising a plurality of components or a controller communicatively connected to the plurality of components; and
    at least one of transmitting and receiving data relating to the plurality of components,
    wherein, when transmitting or receiving data to or from the at least one of the plurality of components or the controller, the data is used for installing software patches on the plurality of components or installing new software on the plurality of components, and
    wherein, when the plurality of components is a plurality of photovoltaic modules, receiving data comprises receiving information comprising photovoltaic module alignment information of the plurality of photovoltaic modules from at least one of the controller or directly from the plurality of photovoltaic modules via one of Wi-Fi, Bluetooth, or cellular network technology.

16. The non-transitory computer readable storage medium of claim 15, wherein the unmanned aerial vehicle is a drone.

17. The non-transitory computer readable storage medium of claim 15, wherein the plurality of components comprise at least one of a plurality of photovoltaic modules or a plurality of power conditioners.

18. The non-transitory computer readable storage medium of claim 15, wherein transmitting data further comprises transmitting commands to the controller for controlling the plurality of components.

* * * * *